(12) United States Patent
Huang et al.

(10) Patent No.: US 10,135,063 B2
(45) Date of Patent: Nov. 20, 2018

(54) CRUMPLED GRAPHENE-ENCAPSULATED NANOSTRUCTURES AND LITHIUM ION BATTERY ANODES MADE THEREFROM

(71) Applicants: Northwestern University, Evanston, IL (US); Korea Institute of Geoscience and Mineral Resources, Daejeon (KR)

(72) Inventors: Jiaxing Huang, Wilmette, IL (US); Hee Dong Jang, Daejeon (KR); Jiayan Luo, Evanston, IL (US)

(73) Assignees: NORTHWESTERN UNIVERSITY, Evanston, IL (US); KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 568 days.

(21) Appl. No.: 13/930,031

(22) Filed: Jun. 28, 2013

(65) Prior Publication Data

US 2013/0344392 A1 Dec. 26, 2013

Related U.S. Application Data

(63) Continuation-in-part of application No. 13/537,686, filed on Jun. 29, 2012.

(Continued)

(51) Int. Cl.
*H01M 4/36* (2006.01)
*H01M 4/04* (2006.01)
(Continued)

(52) U.S. Cl.
CPC .......... *H01M 4/366* (2013.01); *B82Y 30/00* (2013.01); *B82Y 40/00* (2013.01); *C01B 32/194* (2017.08); *C09C 1/3063* (2013.01); *H01M 4/02* (2013.01); *H01M 4/04* (2013.01); *H01M 4/133* (2013.01); *H01M 4/134* (2013.01); *H01M 4/1393* (2013.01); *H01M 4/1395* (2013.01); *H01M 4/583* (2013.01); *H01M 4/625* (2013.01); *H01M 4/88* (2013.01); *H01M 4/96* (2013.01); *H01M 8/16* (2013.01); *C01P 2002/72* (2013.01);
(Continued)

(58) Field of Classification Search
CPC .... H01M 4/366; H01M 4/625; H01M 4/1393; H01M 4/133; H01M 4/96; H01M 4/583; C01B 32/194; B82Y 30/00
USPC ...................................................... 429/231.8
See application file for complete search history.

(56) References Cited

U.S. PATENT DOCUMENTS

2011/0111303 A1* 5/2011 Kung .................. H01B 1/18
                                                                429/231.8
2012/0064409 A1* 3/2012 Zhamu ................. B82Y 30/00
                                                                429/221

OTHER PUBLICATIONS

"A novel bath lily-like graphene sheet-wrapped nano-Si composite as a high performance anode material for Li-ion batteries" RSC Advances, 2011, 1, 958-960, pub. Sep. 7, 2011.*

(Continued)

*Primary Examiner* — Miriam Stagg
*Assistant Examiner* — Brent C Thomas
(74) *Attorney, Agent, or Firm* — The Marbury Law Group PLLC (57) ABSTRACT

Capsules comprising crumpled graphene sheets that form a crumpled graphene shell encapsulating an internal cargo comprising nanostructures of a second component are provided. Also provided are anode materials for lithium ion batteries comprising the capsules, wherein the nanostructures are composed of an electrochemically active material, such as silicon.

18 Claims, 6 Drawing Sheets

Related U.S. Application Data (60) Provisional application No. 61/503,149, filed on Jun. 30, 2011, provisional application No. 61/666,424, filed on Jun. 29, 2012, provisional application No. 61/809,534, filed on Apr. 8, 2013.

(51) Int. Cl.

| | | |
|---|---|---|
| *H01M 4/583* | (2010.01) | |
| *H01M 8/16* | (2006.01) | |
| *H01M 4/88* | (2006.01) | |
| *H01M 4/96* | (2006.01) | |
| *C09C 1/30* | (2006.01) | |
| *H01M 4/02* | (2006.01) | |
| *H01M 4/133* | (2010.01) | |
| *H01M 4/134* | (2010.01) | |
| *H01M 4/1393* | (2010.01) | |
| *H01M 4/1395* | (2010.01) | |
| *H01M 4/62* | (2006.01) | |
| *B82Y 30/00* | (2011.01) | |
| *B82Y 40/00* | (2011.01) | |
| *C01B 32/194* | (2017.01) | |
| *H01M 10/0525* | (2010.01) | |

(52) U.S. Cl.
CPC ...... *C01P 2002/88* (2013.01); *C01P 2004/03* (2013.01); *C01P 2004/04* (2013.01); *C01P 2006/10* (2013.01); *C01P 2006/40* (2013.01); *H01M 10/0525* (2013.01); *H01M 2004/021* (2013.01); *Y02E 60/527* (2013.01)

(56) References Cited

OTHER PUBLICATIONS

Hurt et al., Aerosol Synthesis of Cargo-Filled Graphene Nanosacks, presentation at Graphene 2012 conference, Brussels, Belgium, Apr. 10-13, 2012.

He et al., A Novel Bath Lily-Like Graphene Sheets-Wrapped Nano-Si Composite as a High Performance Anode Material for Li-ion Batteries, Electronic Supplementary Material (ESI) for RSC Advances, Sep. 7, 2011.

He et al., A Novel Bath Lily-Like Graphene Sheets-Wrapped Nano-Si Composite as a High Performance Anode Material for Li-ion Batteries, RSC Advances, vol. 1, Sep. 7, 2011, pp. 958-960.

Yang et al., Interdispersed silicon-carbon nanocomposites and their application as anode materials for lithium-ion batteries, Electrochemistry Communications, vol. 28, Dec. 2, 2012, pp. 40-43.

Wu et al., Graphene/metal oxide composite electrode materials for energy storage, Nano Energy, vol. 1, Dec. 2, 2011, pp. 107-131.

Guo et al., Nanoparticle/Graphene Composites: Toward High-Performance Anode Materials for Lithium-ion Batteries, abstract for a literature seminar at the University of Illinois on Oct. 23, 2010, available online on or before Jun. 10, 2013.

Ma et al., Crumpled Nanopaper from Graphene Oxide, Nano Lett., vol. 12, Dec. 20, 2011, pp. 486-489.

Jang et al., One-Step Synthesis of Pt-Nanoparticles-Laden Graphene Crumples by Aerosol Spray Pyrolysis and Evaluation of Their Electrocatalytic Activity, Aerosol Science and Technology, vol. 47, Oct. 9, 2012, pp. 93-98.

Xiao et al., Crumpled graphene particles for microbial fuel cell electrodes, Journal of Power Sources, vol. 208, Jun. 15, 2012, pp. 187-192.

Sohn et al., Oil absorbing graphene capsules by capillary molding, Chem. Commun., vol. 48, Apr. 17, 2012, pp. 5968-5970.

Luo et al., Crumpled Graphene-Encapsulated Si Nanoparticles for Lithium Ion Battery Anodes, J. Phys. Chem. Lett., vol. 3, Jun. 22, 2012, pp. 1824-1829.

Jang et al., A glucose biosensor based on $TiO_2$-Graphene composite, Biosensors and Bioelectronics, vol. 38, Jun. 6, 2012, pp. 184-188.

Luo et al., Compression and Aggregation-Resistant Particles of Crumpled Soft Sheets, ACS Nano, vol. 5, No. 11, Oct. 13, 2011, pp. 8943-8949.

Chen et al., Aerosol Synthesis of Cargo-Filled Graphene Nanosacks, Nano Lett., vol. 12, Mar. 19, 2012, pp. 1996-2002.

He et al., Electronic Supplementary Information for: A Novel Bath Lily-like Graphene Sheets-Wrapped Nano-Si Composite as a High Performance Anode Material for Li-ion Batteries, The Royal Society of Chemistry, 2011.

\* cited by examiner

CRUMPLED GRAPHENE-ENCAPSULATED NANOSTRUCTURES AND LITHIUM ION BATTERY ANODES MADE THEREFROM

CROSS-REFERENCE TO RELATED APPLICATIONS

The present application is a continuation-in-part of U.S. patent application Ser. No. 13/537,686, filed on Jun. 29, 2012, which claims priority to U.S. provisional patent application Ser. No. 61/503,149, filed on Jun. 30, 2011, the entire contents of which are hereby incorporated by reference. The present application claims priority to U.S. provisional patent application Ser. No. 61/666,424, filed on Jun. 29, 2012, and U.S. provisional patent application Ser. No. 61/809,534, filed on Apr. 8, 2013, the entire contents of which are hereby incorporated by reference.

REFERENCE TO GOVERNMENT RIGHTS

This invention was made without government support.

BACKGROUND

Silicon is a promising high capacity anode material for Li ion batteries. However, the large volume fluctuation upon $Li^+$ insertion/extraction can fracture the material, leading to fast capacity fading due to the loss of electrical continuity. Another problem is that cracking exposes new surface of Si to the electrolyte solvents, which can decompose at low potential to deposit a solid electrolyte interface (SEI) layer of lithiated compounds on the new Si surface. During charge/discharge cycling, the insulating SEI layer can grow thicker, which further degrades the capacity and cycling stability of the Si anode. In an operating battery cell, continuous growth of SEI layer will also gradually deplete the available $Li^+$ and the amount of electrolytes, thus deteriorating the overall performance.

Theoretical and in-situ transmission electron microscopy (TEM) studies have shown that the strain induced by the expansion/contraction can be accommodated in Si nanoparticles with diameters <150 nm. Indeed, it has been shown that various Si nanostructures including nanowires, nanotubes, hollow spheres, nanoparticles and nanoporous Si can withstand $Li^+$ insertion/removal without significant cracking or fracture. However, the formation of SEI layers on these bare Si nanostructures limits their coulombic efficiency to <99% even after reaching steady state, which can drain the cathode and electrolyte in only tens of cycles. In comparison, the coulombic efficiency of graphite anodes can readily reach 99.9% after the first few cycles. One way to prevent the deposition of SEI on Si is to avoid its direct contact with the electrolyte solvent by applying a surface coating, which needs to be electrically conducting and permeable to $Li^+$. Carbon based materials have been used for this purpose. (See, Yoshio, M.; Wang, H. Y.; Fukuda, K.; Umeno, T.; Dimov, N.; Ogumi, Z., Carbon-Coated Si as a Lithium-Ion Battery Anode Material. *J. Electrochem. Soc.* 2002, 149, A1598-A1603; Zhao, X.; Hayner, C. M.; Kung, M. C.; Kung, H. H., In-Plane Vacancy-Enabled High-Power Si-Graphene Composite Electrode for Lithium-Ion Batteries. *Adv. Energy Mater.* 2011, 1, 1079-1084; and He, Y. S.; Gao, P. F.; Chen, J.; Yang, X. W.; Liao, X. Z.; Yang, J.; Ma, Z. F., A Novel Bath Lily-Like Graphene Sheet-Wrapped Nano-Si Composite as a High Performance Anode Material for Li-Ion Batteries. *RSC Adv.* 2011, 1, 958-960.) However, a conformal carbon coating on Si would rupture upon volume expansion, exposing Si to electrolytes for SEI deposition. Therefore, carbon coatings that can accommodate the large volume expansion/contraction of Si are needed. This can be achieved by introducing void space between Si and its carbon coating. For example, very recently Liu et al., reported a yolkshell design of carbon encapsulated Si with high coulombic efficiency up to 99.84% from cycle 500 to 1000 (See, Liu, N.; Wu, H.; McDowell, M. T.; Yao, Y.; Wang, C.; Cui, Y., A Yolk-Shell Design for Stabilized and Scalable Li-Ion Battery Alloy Anodes. *Nano Lett.* 2012, DOI: 10.1021/nl3014814.) Their approach was to first partially oxidize the Si nanoparticles to form a $SiO_2$ surface layer and then form a thin shell coating of polymer, which was later pyrolyzed to amorphous carbon. Upon HF etching to remove $SiO_2$ and reduce the size of the Si nanoparticles, void space was created inside the carbon hollow spheres that can accommodate volume expansion of Si during lithiation, thus preventing the rupture of the carbon shell and resulting in much improved cycling stability.

SUMMARY

Materials comprising sub-micron sized capsules comprising crumpled graphene sheets that form a graphene shell encapsulating an internal cargo comprising nanostructures of a second component are provided. Also provided are anodes comprising the capsules, lithium ion batteries incorporating the anodes and methods of making the capsules.

One embodiment of the present materials comprises a layer of capsules, the capsules comprising: a crumpled graphene shell comprising graphene sheets having a crumpled morphology; and silicon nanostructures encapsulated within the crumpled graphene shell; wherein the average size of the capsules is less than 1 μm.

One embodiment of a lithium ion battery comprises an anode comprising the material described above; a counter electrode; and an electrolyte in electrical communication with the anode and the counter electrode. Embodiments of batteries having this construction are characterized by a coulombic efficiency reaching 99% after 20 cycles, or better at a charge voltage of about 2 V and a current density of about 1 A/g.

An embodiment of a method of making sub-micron sized capsules comprises the steps of: forming an aqueous dispersion comprising graphene oxide sheets and silicon nanostructures; forming aerosol droplets from the aqueous dispersion; and heating the aerosol droplets to evaporate water from the aerosol droplets, whereby the resulting compression induces the formation of the capsules. The resulting capsules comprise crumpled graphene oxide shells comprising the graphene oxide sheets having a crumpled morphology and silicon nanostructures encapsulated within the crumpled graphene oxide shells. In this method, the temperature at which the aerosol droplets are heating is sufficiently high to produce capsules having an average size of less than 1 μm.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Capsules, including sub-micron sized capsules, comprising crumpled graphene sheets that form a crumpled graphene shell encapsulating an internal cargo comprising nanostructures of a second component. Examples of nanostructures that may provide the second component include silicon nanoparticles, $TiO_2$ nanoparticles, metal nanoparticles (e.g., silver or platinum nanoparticles), and salts, such as CsCl. In some embodiments, the sub-micron sized capsules are made of a second component of electrochemically active nanostructures, such as Si nanoparticles, wrapped by the crumpled graphene shells. Such capsules can be used as anode materials in lithium ion batteries.

As used herein, the term "sub-micron sized" refers to capsules having widths or diameters shorter than 1 micrometer (1 µm). The specified widths can be the smallest width (i.e. a width as specified where, at that location, the article can have a larger width in a different dimension), or the largest width (i.e. where, at that location, the article's width is no wider than as specified, but can have a length that is greater).

The use of sub-micron sized capsules in Li ion battery anodes is highly advantageous because their small size allows for faster diffusion of the lithium and, therefore, a faster charge/discharge cycle, relative to an anode composed of larger capsules. Thus, in some embodiments the average capsule size for the capsules is less than 1 µm. This includes embodiments in which the average capsule size is no greater than about 500 nm. As a result, the present anodes are able to provide Li ion batteries with a coulombic efficiency of 99%, or better, over very few cycles at, for example a charge voltage of 2 V and a current density of 1 A/g. Some embodiments of the batteries achieve at least 99% coulombic efficiency in 20 cycles or fewer. This includes embodiments of the batteries that achieve at least 99% coulombic efficiency in 10 cycles or better and further includes embodiments of the batteries that achieve at least 99% coulombic efficiency in 5 cycles or better.

The capsules can be made by a rapid, one-step capillary driven assembly route in aerosol droplets, as described in greater detail in the example below. The aerosol synthesis route allows continuous mode of operation and is readily scalable. In one such assembly route, an aqueous dispersion of micron-sized graphene oxide (GO) sheets and Si nanostructures is nebulized to form aerosol droplets, which are passed through a preheated tube furnace. During the assembly process, evaporation-induced capillary forces wrap the graphene (a.k.a., reduced GO) sheets around the Si nanostructures, and heavily crumple the shell. The folds and wrinkles in the crumpled graphene coating can accommodate the volume expansion of Si upon lithiation without fracture and, thus, help to protect the Si nanostructures from excessive deposition of the insulating solid electrolyte interphase. Compared to the native Si nanostructures, the composite capsules can have improved performance as Li ion battery anode materials in terms of capacity, cycling stability and coulombic efficiency. As such, another aspect of the invention relates to lithium ion battery anodes formed of crumpled graphene-encapsulated Si nanostructures.

Figure 1:
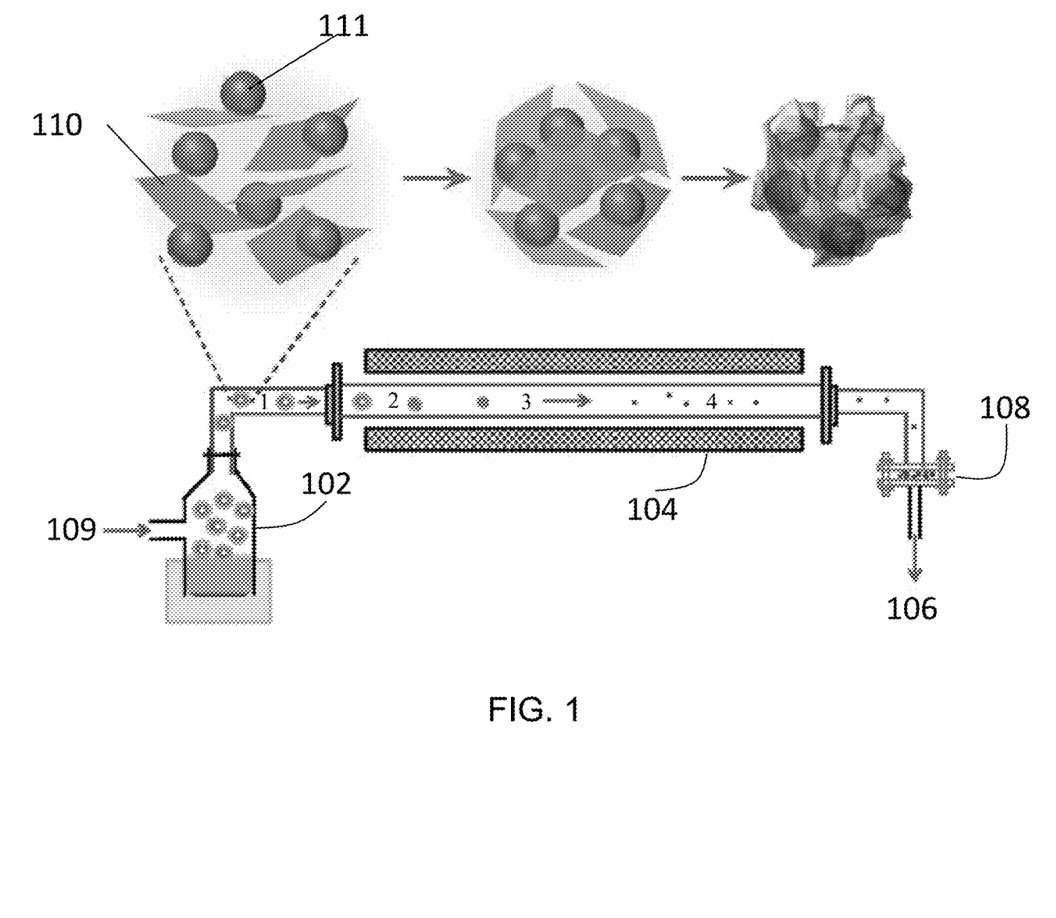
FIG. 1. Schematic drawing illustrating a method and apparatus for the aerosol assisted capillary assembly of crumpled graphene wrapped Si nanoparticles.

A method and apparatus for making crumpled graphene-encapsulated Si nanostructures by a facile, capillary driven assembly route in aerosol droplets are shown in FIG. 1. It has been shown previously that crumpled graphene oxide (GO) and graphene (i.e., r-GO) particles resembling crumpled paper balls can be made by capillary compression of the sheets in evaporating aerosol droplets. (See, Luo, J. Y.; Jang, H. D.; Sun, T.; Xiao, L.; He, Z.; Katsoulidis, A. P.; Kanatzidis, M. G.; Gibson, J. M.; Huang, J. X., Compression and Aggregation-Resistant Particles of Crumpled Soft Sheets. *ACS Nano* 2011, 5, 8943-8949.)

The apparatus includes an ultrasonic atomizer 102, a tube furnace 104, such as a horizontal or a vertical tube furnace, connected to the ultrasonic atomizer 102, an exhaust 106 of the tube furnace 104, and a filter 108 at the exhaust 106. There are 4 stages for the tube furnace 104, including stage 1 immediately before the entrance of the tube furnace 104, stage 2 inside the tube furnace 104 near the entrance, stage 3 at the middle part of the tube furnace 104, and stage 4 near the exit of the tube furnace 104.

After a dispersion of graphene-based material sheets (e.g., graphene or GO sheets) and nanostructures is formed, the dispersion is provided in the ultrasonic atomizer 102 to be nebulized to form the aerosol droplets. Then, a carrier gas 109 is provided to the ultrasonic atomizer 102 for transferring or flying the aerosol droplets toward the tube furnace 104. The carrier gas can be an inert gas or other low-responsive gases. For example, the carrier gas may be $N_2$. Then, the carrier gas brings the aerosol droplets to pass through the pre-heated channel of the tube furnace 104 at a predetermined temperature.

In passing the tube furnace 104, rapid evaporation causes shrinkage of the aerosol droplets, first concentrating the graphene-based material sheets and subsequently compressing them into crumpled particles of sub-micron scale encapsulating the nanostructures. The resulting capsules can be collected at the exhaust 106 of the tube furnace by the filter 108.

The top panel in FIG. 1 illustrates the formation of the capsules during processing. The left image illustrates GO sheets 110 and nanostructures 111 in a dispersion. The center image shows that during evaporation, the GO sheets first migrate to the surface of the droplets due to their amphiphilicity. Finally, as shown in the right image, the GO sheets then tightly wrap the nanostructures upon complete evaporation. The GO can also be reduced upon further heating. Since the lateral dimension of the initial GO sheets is much larger than the nanoparticles, the graphene shell can be heavily crumpled due to capillary stress.

It is important that the aerosol droplets are dried sufficiently fast to evaporate the liquid sufficiently quickly to provide a sub-micron sized capsule. This can be accomplished by an appropriate selection of processing conditions, such as an appropriate combination of the size of the initial aerosol droplets, concentration of materials in the initial dispersion and drying speed, which can be controlled via the drying temperature. Therefore, in some embodiments the pre-determined temperature to which the aerosol droplets are exposed in the furnace is at least about 500° C. For example, the pre-determined temperature may be at least about 600° C. This includes embodiments in which the predetermined temperature is in the range of about 600-2000° C. In some embodiments, the predetermined temperature is in the range of about 600 to about 800° C. In one embodiment, the predetermined temperature is about 600° C.

In one embodiment of the present methods using an apparatus of the type shown in FIG. 1, Si nanoparticles (50-100 nm diameter nanoparticles, for example) in an aqueous suspension are added to a dispersion of micron-sized GO sheets. The colloidal mixture is then nebulized to form aerosol droplets, which are blown through a preheated tube furnace (at, for example, 600° C.) with an inert carrier gas, such as $N_2$. As water evaporates, the amphiphilic GO sheets migrate to the surface of the droplets to form a shell. Since the diameter of the Si nanoparticles is much smaller than that of the aerosol droplets, further evaporation can collapse the GO shell, resulting in a raisin-like morphology that encapsulates the Si particles. The GO can be partially reduced thermally before reaching the collector, and further reduced after collection by annealing at an elevated temperature for a sufficiently long period of time under an inert atmosphere (for example, 700° C. in Ar for 2 h).

Although the process is illustrated above using water as the solvent for the dispersion, the crumpled particles can be dispersed in other solvents regardless of their density or polarity without using surfactant due to minimized inter-particle Van der Waals attraction. Other solvents include, but are not limited to, methanol, isopropanol, acetone, chloroform, tetrahydrofuran, toluene, cyclohexane, dichlorobenzene and ethylene glycol.

The resulting capsules have shells that are characterized by a crumpled morphology, which provides the capsules with fractal-dimensional crumpled ball structures having fractal dimension values of between 2 and 3. As a result, the capsules are stable against unfolding or collapsing due to the large number of $\pi$-$\pi$ stacked ridges. They are also aggregation resistant since the crumpled morphology prevents strong inter-particle van der Waals attraction.

The graphene or GO sheets used to make the capsules are desirably micron-sized sheets. That is, they have micron-sized widths. As used herein, the terms “micron-sized”, “micron-scaled”, “microscopic”, the “micron-” prefix, and the like generally refers to elements or articles having widths or diameters in the order of micrometers ($10^{-6}$ meters). For example, the sheets may have a width of at least 1 μm. In all embodiments, specified widths can be the smallest width (i.e., a width as specified where, at that location, the article can have a larger width in a different dimension), or largest width (i.e., where, at that location, the article's width is no wider than as specified, but can have a length that is greater).

The nanostructures used to make the capsules may be electrochemically active and, therefore, comprise electrochemically active materials. As used herein, a “nanostructure” refers to an object of intermediate size between molecular and microscopic (micrometer-sized) structures. Sphere-like nanoparticles have fractal-dimensions on the nanoscale, i.e., the particle is between 0.1 and 1000 nm in each spatial dimension. A list of nanostructures includes, but is not limited to, nanoparticles, nanocomposites, quantum dots, nanofilms, nanoshells, nanofibers, nanorings, nanorods, nanowires, nanotubes, and so on. In some embodiments the nanostructures are nanoparticles characterized by diameters between about 50 and about 100 nm.

Silicon is one example of an electrochemically active material. However, the nanostructures may comprise, consist of or consist essentially of other materials, especially those that undergo volume expansion and have low conductivity, solubility or instability in the battery electrolyte. Examples of expandable, electrochemically active materials, include Sn, Ge, Sb, or other monometallic, bimetallic, or multimetallic materials, or oxidic or sulfide materials, or their mixtures. Some specific examples include metal oxides, such as $TiO_2$, $ZnO$, $SnO_2$, $Co_3O_4$, $Fe_2O_3$, $MnO_2$, $Mn_3O_4$, $MnO$, $Fe_3O_4$, $NiO$, $MoO_2$, $MoO_3$, $CuO$, $Cu_2O$, $CeO_2$, $RuO_2$, and NiO.

The mass fraction of the nanostructures in the capsule is desirably quite high. In some embodiments the mass fraction of the nanostructures is 50% or greater. This includes embodiments in which the mass fraction of the nanostructures is 60% or greater.

The capsules are well suited for use as anode materials in lithium ion batteries for a number of reasons. First, graphene is highly electrically conductive and lithium transportable. Second, the voids inside the crumpled graphene and the wrinkles on the crumpled graphene shell allow the nanostructures to expand and contract freely, without rupturing the crumpled shell. Third, the mechanically stable crumpled graphene shell can isolate the nanostructures, preventing them from contacting the electrolyte solvents and, thus, a stable SEI layer can form only outside the graphene shell. Fourth, the channels within the crumpled ball stack of the electrode allow electrolyte to transport easily. Fifth, unlike hollow spheres, the crumpled structure can clasp the nanostructures within its folds, thus preventing nanostructure aggregation during the charge/discharge cycle of the battery. And, sixth, the aerosol flow process is compatible with electrode slurry coating techniques.

In a basic embodiment, the anodes comprise the capsules, a binder and, optionally, an additional electrochemically active filler material, such as carbon black. The binder, which is used to hold the capsules together, is typically a polymeric material such as a polyacrylic acid or poly (vinylidene fluoride) (PVDF).

A lithium ion battery incorporating the anode further comprises a counter electrode and an electrolyte solution in electrical communication with the anode and the counter electrode. The electrolyte may comprise a variety of lithium salts including, but not limited to, $LiPF_6$. The counter electrode comprises an electrically conductive material and may be, for example, a thin metal foil, such as a Li foil or a Cu foil.

EXAMPLE

This example illustrates one embodiment of a method of forming capsules comprising a crumpled graphene shell encapsulating silicon nanoparticles and lithium ion battery anodes made therefrom.

Materials and Methods

Synthesis of crumpled capsules. GO was prepared by a modified Hummers' method and purified by a two-step washing procedure. (See, Hummers, W. S.; Offeman, R. E., Preparation of Graphitic Oxide. *J. Am. Chem. Soc.* 1958, 80, 1339-1339; and Kim, F.; Luo, J. Y.; Cruz-Silva, R.; Cote, L. J.; Sohn, K.; Huang, J. X., Self-Propagating Domino-Like Reactions in Oxidized Graphite. *Adv. Funct. Mater.* 2010, 20, 2867-2873.) Si nanoparticles (50~100 nm, Meliorum Nanotechnology) were used as received. GO (1 mg/ml) and Si (0.6 mg/ml) were mixed in water and nebulized by an ultrasonic atomizer (1.7 MHz, UN-511, Alfesa Pharm Co.). The aerosol droplets were carried by $N_2$ gas at 1 L/min to fly through a horizontal tube furnace (tube diameter=1 inch) pre-heated to 600° C. The product was collected at the exhaust, and then further annealed at 700° C. in Ar for 2 hours.

Characterization.

SEM images were collected on a FEI NOVA 600 SEM microscopes. STEM was conducted on a Hitachi HD-2300A FESTEM operated at 200 kV. The elemental mapping of C was carried out using its EELS spectra imaging function. Si mapping was done by EDX. XRD pattern was collected by an INEL CPS120 powder diffractometer with Cu Kα radiation ($\lambda$=1.5418 Å) at 40 kV. TGA (Mettler Toledo, TGA/SDTA851) was performed at the rate of 10° C./min in air.

Electrochemical Test.

Charge/discharge tests were done using a CR2032-type coin cell. Metallic lithium was used as the counter electrode. The working electrode was fabricated by first pasting a mixture of the crumpled capsules or bare Si nanoparticles, carbon black and poly(acrylic acid) binder ($M_w$=3,000,000, Aldrich) with a weight ratio of 70:15:15 onto a copper foil (12 mm diameter) and compressing at 10 MPa. The typical mass loading level was about 0.2 mg of graphene/Si capsules per $cm^2$ area of the electrode. The electrode was dried at 80° C. for 12 h under vacuum before being assembled into a coin cell in an Ar-filled glove box. The electrolyte solution was 1 M $LiPF_6$/ethylene carbonate (EC)/dimethyl carbonate (DMC) (1:1 by volume). A microporous glass-fiber membrane (Whatman) was used as a separator. Galvanostatic charge/discharge measurements were conducted with a MTI battery analyzer BST8-W A at various current densities between voltages of 0.02 and 2 V vs. $Li/Li^+$. Lithium insertion into the Si electrode was referred to as discharge, and extraction was referred to as charge. The capacity was determined based on the mass of the capsules or bare Si nanoparticles. The electrochemical impedance measurements were conducted on the coin cells using an Autolab electrochemical interface instrument (PGSTAT 302N) within frequency range of 10 kHz and 10 MHz.

Figure 2A:
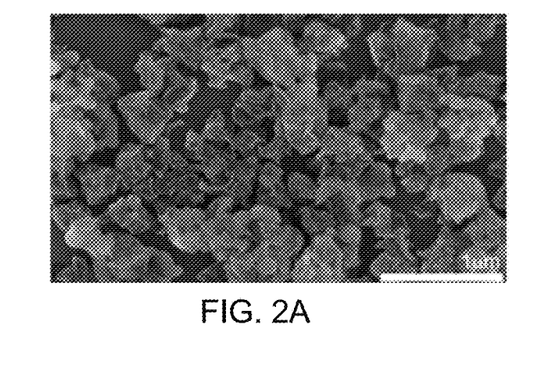
FIG. 2A. SEM image showing a low-magnification image of crumpled capsules of graphene-wrapped Si.
Figure 2B:
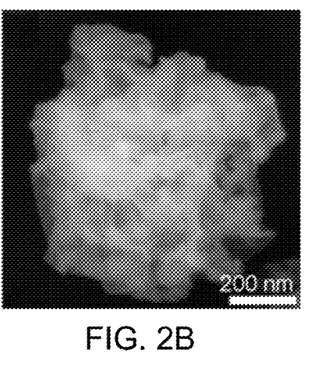
FIG. 2B. SEM image showing a single capsule.
Figure 2C:
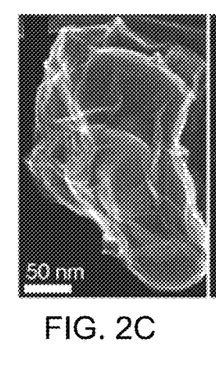
FIG. 2C. STEM image of a single capsule under scanning mode.
Figure 2D:
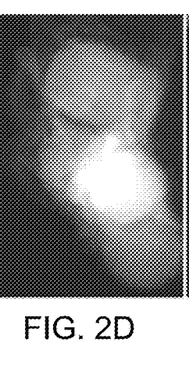
FIG. 2D. STEM image of a single capsule under Z-contrast transmission mode, clearly showing encapsulated Si nanoparticles.
Figure 2E:
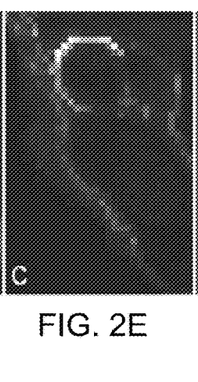
FIG. 2E. EELS elemental mapping for carbon.
Figure 2F:
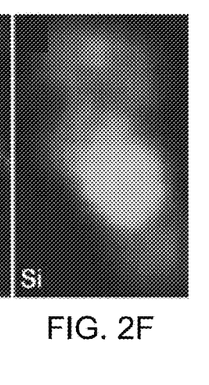
FIG. 2F. EDX mapping of element Si of the same capsule as FIG. 2C.

Results:

FIGS. 2A and 2B are SEM images of the product, showing submicron-sized crumpled capsules, with a submicron average particle size for the collection of particles. No unwrapped Si nanoparticles were observed suggesting high encapsulation yield. The graphene shells were heavily crumpled with many folds and wrinkled as a result of capillary compression. Close examination of a single capsule by scanning transmission electron microscope (STEM) substantiated that Si nanoparticles were wrapped in the crumpled graphene (FIGS. 2C and 2D). The size of the Si nanoparticles was between 50 and 100 nm, and the crumpled graphene shell was around 5-10 nm thick, corresponding to about 15-30 graphene layers. Electron energy loss spectroscopy (EELS) was employed to map carbon (FIG. 2E) and energy-dispersive X-ray spectroscopy (EDX) was employed to map Si (FIG. 2F), and the results confirmed that Si nanoparticles were indeed wrapped by crumpled graphene shells. The X-ray diffraction (XRD) pattern of the capsules showed the characteristic peaks of Si and a broad band centered at 25° of the graphite (002) diffraction peak. The latter suggested turbostratic packing of the graphene (i.e. r-GO) sheets in the shell. The thermal gravimetric analysis (TGA) profile recorded during heating in air showed a nearly 40% weight loss was recorded at 500° C. due to combustion of the graphene shells. The Si nanoparticles were stable against oxidation up to 700° C. due to a protective native oxide layer on their surface. Therefore, the mass fraction of Si in the final capsules was determined to be 60%.

Figure 3:
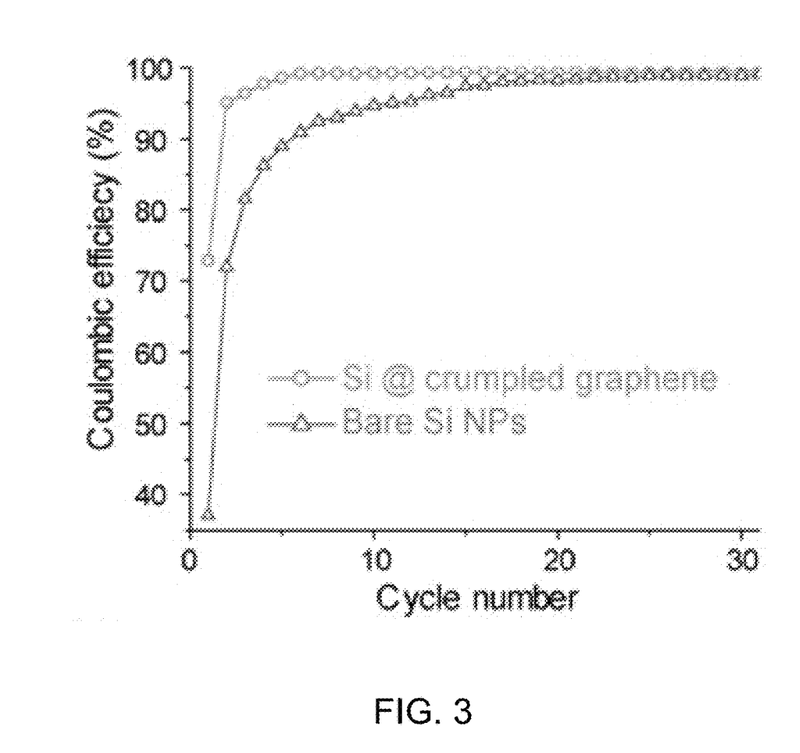
FIG. 3. Coulombic efficiency of an anode comprising crumpled graphene wrapped Si nanoparticles in comparison to an anode comprising unwrapped Si nanoparticles at a constant current density of 1 A/g.
Figure 4:
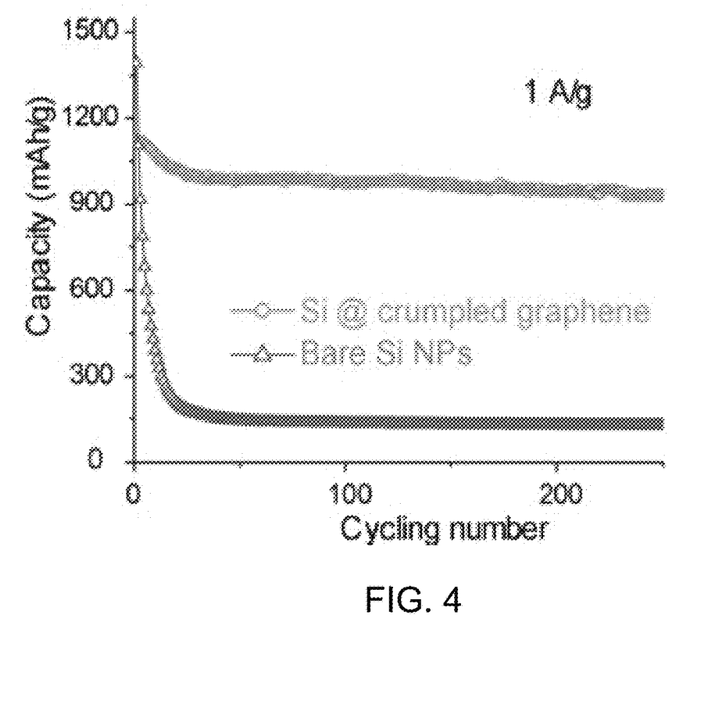
FIG. 4. Charge/discharge cycling capacity of an anode comprising crumpled graphene wrapped Si nanoparticles in comparison to an anode comprising unwrapped Si nanoparticles at a constant current density of 1 A/g.
Figure 5:
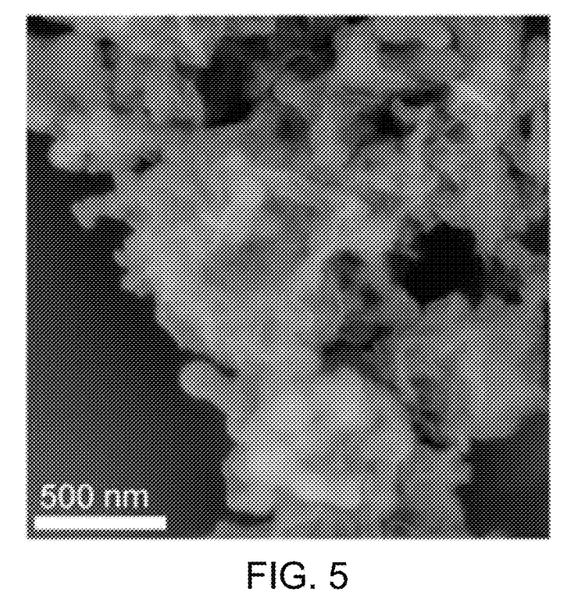
FIG. 5. SEM image of the capsules after 250 cycles showing that Si nanoparticles were still encapsulated in the crumpled graphene.

The electrochemical performance of the composite capsules and native Si nanoparticles were evaluated using deep galvanostatic charge/discharge cycles between 2-0.02 V in a coin cell (RS2032) with lithium foil as the counter electrode and $LiPF_6$ in ECIDMC as electrolyte. The storage capacities of the anodes made with the graphene-wrapped Si and with native Si were calculated based on the mass of the composite and the mass of bare Si nanoparticles, respectively. The first and second charge/discharge voltage profile for the crumpled graphene-encapsulated Si nanoparticles showed that the coulomb efficiency for the first cycles was 73% when tested at a constant current density of 1 A/g (FIG. 3). This was likely due to the irreversible lithium reaction with the residual functional groups in crumpled graphene and the initial SEI layer formation. However, for the unprotected Si, the first-cycle efficiency was only 37%. The nearly doubled coulomb efficiency for the first cycle suggests the effective insulation of Si from the electrolyte solvents by the crumpled graphene shell. The coulombic efficiency of the composite capsules increased quickly, reaching 99% after 5 cycles and 99.5% after 50 cycles, which is higher than that of Si nanoparticles-graphene paper composite. In contrast, bare Si particles exhibited only 90% coulombic efficiency at the 5th cycle, and 95% at the 10th cycle. After the 20 cycles, the bare Si particles were severely deactivated, showing nearly 90% decrease in capacity (FIG. 4). The low coulombic efficiency and fast capacity fade of unprotected Si can be attributed to the loss of electrical connectivity due to the continuous growth of the SEI layer. Eventually the growth of SEI layer would stop when the Si is completely covered, leading to gradually stabilized performance with improved coulombic efficiency but very low capacity (FIGS. 3 and 4). For the composite capsules, since the crumpled shell can expand without cracking, the Si nanoparticles were effectively protected while maintaining electrical contact, leading to much higher coulombic efficiency throughout cycling. Even if there were some pinholes on the crumpled graphene shell, they could be plugged effectively by the SEI layer that is developed there to form a protective shell around clusters of Si particles. In this manner, the composite retains 83% of the charge capacity after 250 cycles. Half of the capacity loss occurred during the first 15 cycles, after which only about 0.05% of capacity loss was observed for each cycle, yielding a capacity about 940 mAh/g after 250 cycles. After cycling, the capsules were recovered from the cell and washed with acetonitrile and 1M Hel to remove the SEI layer before SEM observation. The SEM image in FIG. 5 shows that the expected crumpled capsule morphology was retained.

Electrochemical impedance measurements on coin-cell devices of bare Si nanoparticles and composite capsules were conducted to study the deposition of SEI layers on both types of electrodes. An arch in the impedance spectra corresponds to an electrochemical reaction, the diameter of which can be interpreted as the resistance of charge transport. Since, typically, an SEI layer forms below a cell voltage of 0.8 V, when the cell is biased at 2 V, the arches observed in the impedance spectra correspond to charge transport during lithiation/delithiation of Si. The spectra of bare Si nanoparticle electrode before and after cycling for 250 times showed that the arch became wider after cycling, suggesting that SEI layer had grown thicker. For the graphene/Si capsule composite, the arch also widened, but remained much smaller than those for the bare Si nanoparticles. This suggests that SEI deposition in the capsule composite electrode has been greatly suppressed.

Figure 6:
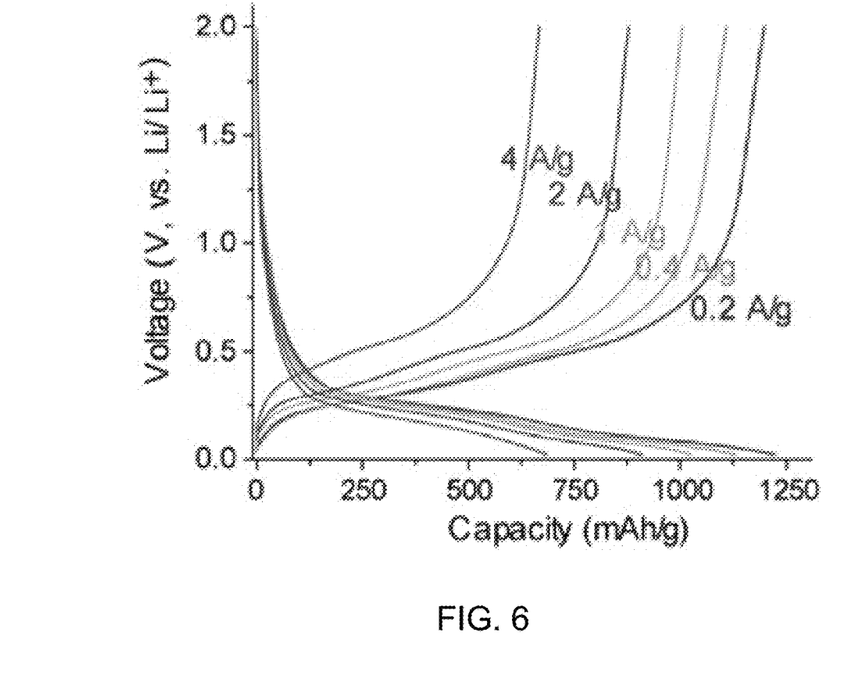
FIG. 6. Galvanostatic charge/discharge profiles of an anode comprising crumpled graphene wrapped Si nanoparticles at current densities ranging from 0.2 to 4 A/g.

The typical galvanostatic charge/discharge profiles of the composite capsules were measured at various current densities ranging from 0.2 to 4 A/g, corresponding to area density of around 0.05 mA to 1 mA/cm$^2$ (FIG. 6). The composite delivered about 1200 mAh/g at a low current density of 0.2 A/g. To extract the capacity contributed by Si, anodes made with crumpled graphene itself were tested. The capacity of graphene was calculated from the second cycle of charge/discharge curve to be 338 mAh/g at 0.2 A/g. Since graphene weights 40% in the composite, the contribution from Si particles would be around 1775 mA/g. This corresponds to a maximal lithiated state of $Li_{1.85}Si$. The anode made of crumpled graphene-wrapped Si particles had good rate capability: It lost less than half of its capacity when the current density was increased 20 times from 0.2 to 4 A/g (FIG. 6).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A material comprising a layer of capsules, the capsules each comprising:
    a crumpled graphene shell comprising graphene sheets having a crumpled morphology; and
    silicon nanostructures encapsulated within the crumpled graphene shell,
    wherein:
    the crumpled graphene shell is configured to encapsulate the silicon nanostructures, such that when the material is disposed in an electrolyte, the crumpled graphene shell prevents contact between the silicon nanostructures and a solvent of the electrolyte, and wherein the average size of the capsules is less than 1 μm; and
    when incorporated in a lithium-ion cell at a silicon to graphene weight ratio of 60:40, the material has an initial coulombic efficiency of at least 73%, after an initial charge-discharge cycle at a current density of 1 A/g, and the material retains a charge capacity of at least 83% after 250 consecutive cycles at a charge voltage of 2V and a current density of 1 A/g.

2. The material of claim 1, wherein the graphene sheets are micron-sized graphene sheets that form crumpled ball structures that isolate and completely encapsulate the silicon nanostructures.

3. The material of claim 1, wherein the silicon nanostructures are nanoparticles having diameters in the range from about 50 nm to about 100 nm.

4. A lithium ion battery comprising:
    an anode comprising the material of claim 1;
    a solid electrolyte interface layer disposed only on outer surfaces of crumpled graphene shells of the material and not on outer surfaces of the silicon nanostructures;
    a counter electrode; and
    an electrolyte in electrical communication with the anode and the counter electrode,
    wherein the battery retains a charge capacity of at least 83% after 250 consecutive cycles at a charge voltage of 2V and a current density of 1 A/g.

5. The battery of claim 4, wherein the anode further comprises a binder.

6. The battery of claim 4, wherein the battery has a coulombic efficiency that approaches about 99% after 20 cycles at a charge voltage of 2V and a current density of 1 A/g.

7. The battery of claim 6, wherein the battery has a coulombic efficiency that approaches about 99% after 10 cycles at a charge voltage of 2V and a current density of 1 A/g.

8. The battery of claim 7, wherein the battery has a coulombic efficiency that approaches about 99% after 5 cycles at a charge voltage of 2V and a current density of 1 A/g.

9. The material of claim 1 wherein the graphene sheets comprise graphene oxide sheets.

10. The material of claim 1 wherein the capsules have a mass fraction of silicon nanostructures of from about 50 percent to about 60 percent.

11. The material of claim 1 wherein the crumpled graphene shell has a fractal-dimensional ball structure.

12. The material of claim 11 wherein the fractal-dimensional ball structure has a fractal dimension from about 2 to about 3.

13. The material of claim 1 wherein a plurality of ridges extend outwardly from an outer surface of the crumpled graphene shell.

14. The material of claim 13 wherein the ridges of crumpled graphene shells are arranged in a π-π stacked structure.

15. A material comprising capsules, each capsule comprising:
    a shell structure encapsulating a void space and comprising graphene sheets having a crumpled morphology; and
    silicon nanostructures disposed inside the crumpled shell structure and in the void space,
    wherein when incorporated in a lithium-ion cell, the material has a coulombic efficiency that approaches about 99% after 20 cycles at a charge voltage of 2V and a current density of 1 A/g, and the material retains a charge capacity of at least 83% after 250 cycles at a charge voltage of 2V and a current density of 1 A/g, and wherein the average size of the capsules is less than 1 μm.

16. The material of claim 15 wherein the void space is devoid of graphene sheets.

17. The material of claim 15 wherein the graphene sheets comprise graphene, graphene oxide, reduced graphene oxide, or a combination thereof.

18. The material of claim 15 wherein the enclosed shell structure defines a single void space that is devoid of graphene sheets and within which the silicon nanostructures are disposed.

* * * * *